June 14, 1955      W. BOYD      2,710,503

NOZZLE BOX ATTACHMENT

Filed April 8, 1952      3 Sheets-Sheet 1

INVENTOR
W. BOYD
PER
ATTORNEY

June 14, 1955 W. BOYD 2,710,503
NOZZLE BOX ATTACHMENT
Filed April 8, 1952 3 Sheets-Sheet 2

INVENTOR
W. BOYD
PER
ATTORNEY.

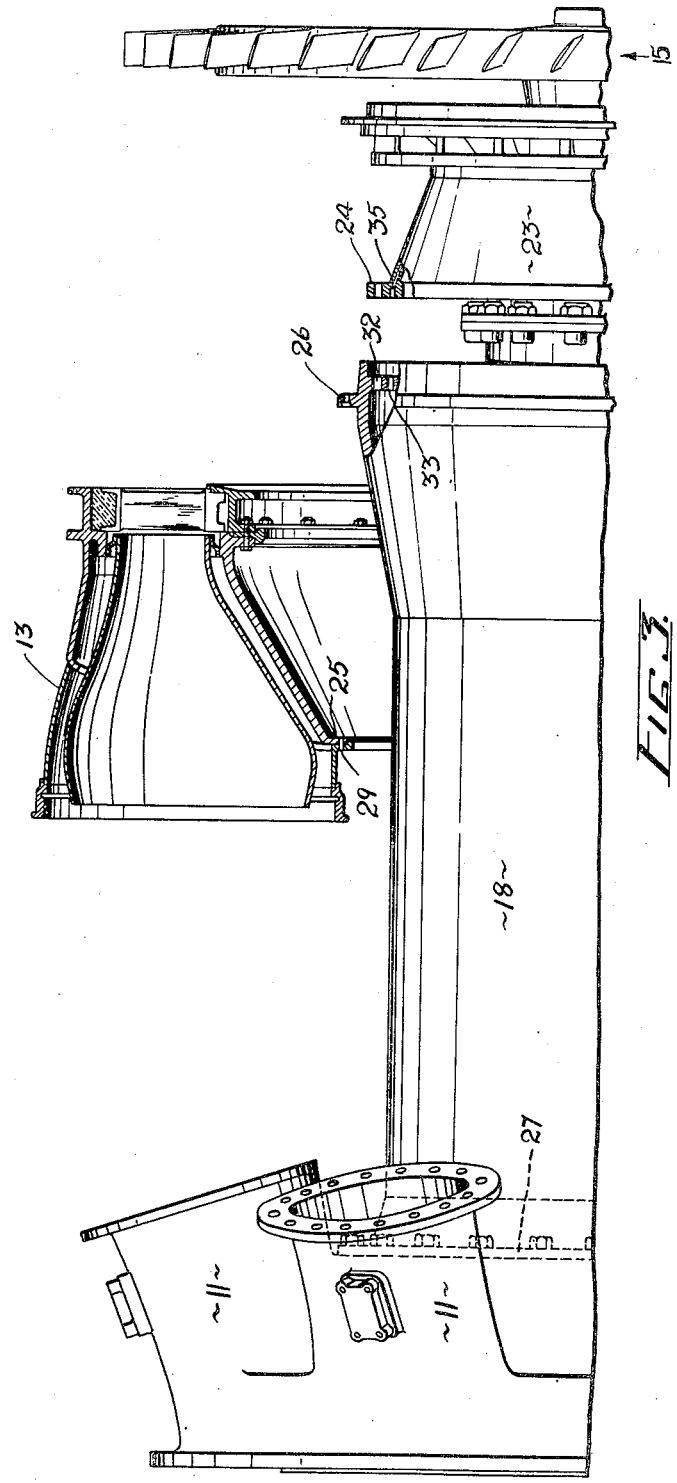

United States Patent Office 2,710,503
Patented June 14, 1955

2,710,503

NOZZLE BOX ATTACHMENT

Winnett Boyd, Bobcaygeon, Ontario, Canada, assignor to A. V. Roe Canada Limited, Malton, Ontario, Canada, a corporation Application April 8, 1952, Serial No. 281,129

7 Claims. (Cl. 60—39.37)

This invention refers to the structural arrangement of the parts of gas turbine engines and in particular to the attachment of nozzle box structures to such engines.

In the production and servicing of gas turbine engines, the ease of assembly and dismantling is an important factor in the reduction of initial costs and in increasing the efficiency of engine maintenance. In the most usual arrangement of the parts of a gas turbine engine the bearing and bearing support for the turbine rotor shaft are situated immediately in front of the turbine disc where direct access to them is barred by the disc itself and by the nozzle box which surrounds them. It is therefore very difficult to gain access to them in order to attach the bearing support to the engine backbone structure and to connect the necessary services for the bearing, such as the bearing oil supply, oil scavenge and cooling air lines. Either these attachments and connections must be made through large openings or handholes in the backbone member, or the turbine disc must be mounted upon the shaft after it has been completely assembled in the engine. The latter method necessitates the provision of a central hole through which the disc can be fastened to the shaft, an expedient which greatly reduces the centrifugal strength of the disc.

It is an object of this invention to provide an arrangement in which the nozzle box can be moved forwardly to allow access to the turbine bearing group for assembly and dismantling purposes.

A further object of the invention is to provide an arrangement which allows easy access to the bolts which secure together the bearing support housing and the backbone member and also to the connections for oil, air, bearing thermo-couple and other services.

Another object of this invention is to provide a convenient and efficient method of connecting and disconnecting the essential services which are conducted by lines cored or drilled in the backbone and the bearing housing castings.

Still another object of the invention is to provide an arrangement whereby the nozzle guide vanes are readily accessible for examination or replacement without removing the turbine rotor.

Other objects and advantages will become apparent during the course of the following description of a preferred example.

In the accompanying drawings, forming a part of this specification, and in which like reference characters are employed to designate like parts throughout the same;

Fig. 4 is a fragmentary sectional view, on a still more enlarged scale, showing the arrangement of the assembly of the backbone member and turbine bearing support, and the connection of one of the oil lines, and Fig. 5 is a fragmentary sectional view showing an alternative arrangement of the assembly shown in Fig. 4 and indicating the relative position of the nozzle box thereto.

Figure 1:
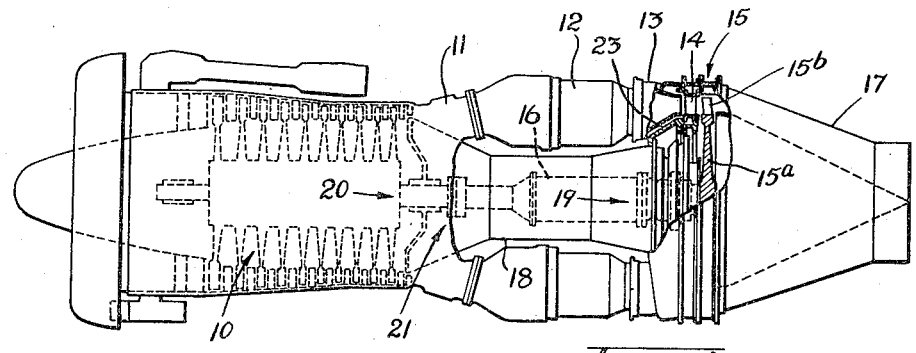
Fig. 1 is an elevational view of a gas turbine engine showing the general location of the backbone member, the nozzle box, the turbine and the turbine bearing.

The gas turbine engine shown in Fig. 1 comprises an axial flow compressor 10 discharging through a diffuser casing 11 into an annularly arranged group of combustion chambers 12. Fuel is added to the compressed air in the combustion chambers and burned, the products of combustion being discharged rearwardly through a nozzle box 13 and past nozzle guide vanes 14 to drive a turbine 15. The turbine comprises a turbine disc 15a and turbine blading 15b mounted peripherally on the disc, and the compressor 10 is driven by the turbine to which it is connected by the shaft 16. The exhaust gases from the turbine are discharged through the tail cone 17 to provide a propulsive thrust.

The principal structural member of the engine is a hollow and generally cylindrical cast backbone member 18 surrounding the shaft 16 and supporting the diffuser casing 11 and the nozzle box 13 at its forward and rearward ends respectively.

Figure 2:
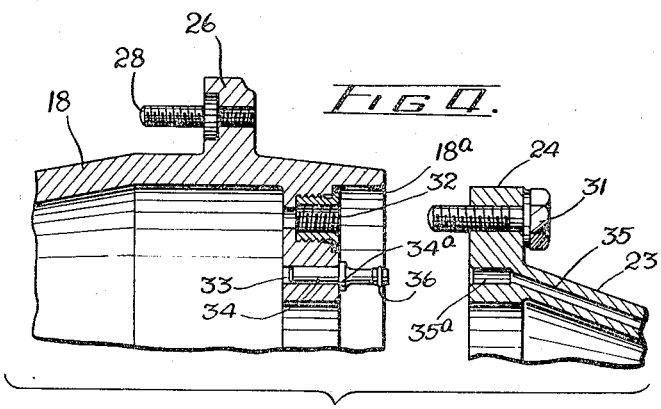
Fig. 2 is a fragmentary longitudinal sectional view of a part of the engine on an enlarged scale, showing the nozzle box atttached to the engine in its operative position.
Figure 3:
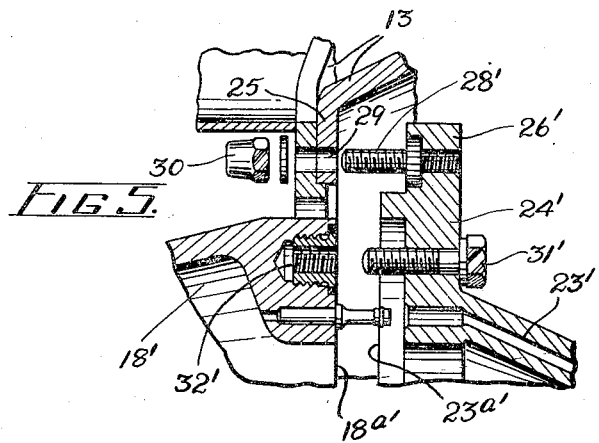
Fig. 3 is a fragmentary longitudinal sectional view of the part of the engine shown in Fig. 2, after the combustion chambers have been removed, the nozzle box structure moved forwardly and the turbine rotor and bearing assembly moved backwardly from their attachments to the backbone member.
Figure 2:
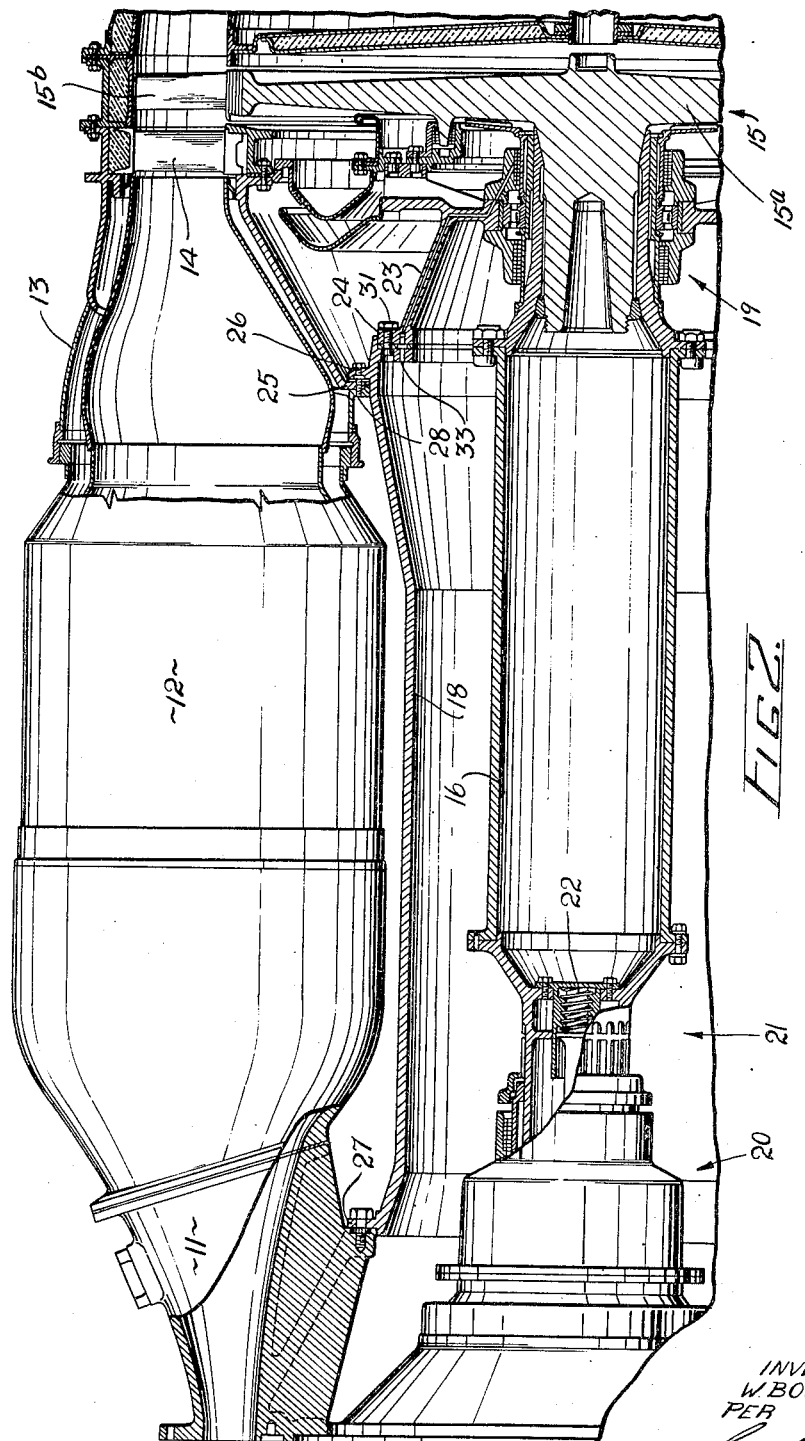

The shaft 16 is supported in the backbone member by means of a journal bearing 19 adjacent the turbine and a thrust journal bearing 20 adjacent the compressor. Between the bearings, the shaft incorporates a flexible coupling 21 which may conveniently be of the type described in my application No. 108,509 dated August 4, 1949, and which includes a tie bolt 22 (see Fig. 2) whereby the turbine is axially located in relation to the thrust journal bearing. The bearing 20 is mounted within the backbone member 18 and the bearing 19 is housed in a generally frusto-conical bearing support 23, which is attached by an annular flange 24 at its base to the annular, rearward end face 18a of the cylindrical backbone member as will be more clearly seen in Figs. 2, 3 and 4.

The nozzle box is attached to the backbone member by an internal annular flange 25 on the nozzle box which engages an external annular flange 26 on the backbone member, while the diffuser casing 11 is attached to an external flange 27 at the forward end of the said backbone member; this general arrangement of the parts on the backbone member is in conformity with the usual pratctice. However, the particular arrangement of the flanges according to the invention differs substantially from that conventionally employed in that the flange 25 on the nozzle box 13 engages the forward, rather than the rearward face of the flange 26 of the backbone member 18 and is therefore assembled thereto by being threaded over the backbone member from the forward end; for this purpose the external diameter of the flange 27 at the forward end of the backbone member must be smaller than the internal diameter of the flange 25. Studs 28 arranged around the flange 26 extend forwardly to enter a corresponding group of holes 29 in the flange 25 and the flanges are held together by stiff nuts 30, which are acceessible from the front before the combustion chambers are installed.

The flange 24 of the bearing support 23 is spigotted into a shallow annular recess in the rearward end face 18a of the backbone member and is secured by cap screws 31, entering threaded sockets 32 in the said end face. The conical formation of the support 23 renders these cap screws accessible from the rear, prior to the mounting of the nozzle box, without removal of the turbine disc 15a from the shaft 16.

A typical connection of an oil line or other service conduit according to the invention is shown in Fig. 4. The conduit consists of a cored hole 33 in the backbone member casting and a liner 34 is fitted into the end of the hole and protrudes from the rearward end face 18a. The conduit is continued as a cored hole 35 in the bearing support 23, the entry 35a to this hole forming a socket which is so positioned and accurately bored that it will engage and accommodate the protruding portion of the liner 34 when the support 23 and the backbone member are assembled together. A flange 34a on the liner and engaging the end face 18a of the backbone member locates the liner longitudinally, and a gland ring 36 on the liner is provided to make a leakproof seal with the walls of the bore 35a.

From the foregoing description of the construction it will be clear that the order of assembly is as follows. The nozzle box 13 is first threaded over the flange 27 at the forward end of the backbone member 18, but it is not moved aft at this stage. The backbone member is then attached by the flange 27 to the diffuser casing 11 in which the thrust journal bearing 20 is already mounted. The shaft 16, fully assembled to the turbine 15, the bearing 19 and the bearing support 23, is then inserted forwardly into the rearward end of backbone member and drawn forward into position by the rotation of the turbine to screw home the tie bolt 22. During this operation the protruding portions of the liners 34 enter the bores 35a in the bearing support and when the operation is completed the flange 24 of the bearing support is in engagement with the rearward end face 18a of the backbone member. The cap screws 31 are then inserted, tightened and locked.

The nozzle box 13, carrying the previously assembled nozzle guide vanes 14, is then moved aft until the rear face of the flange 25 engages the front face of the flange 26 on the backbone member, the studs 28 then protruding through the holes 29. The stiff nuts 30 are then put on from the front, fastening the nozzle box in position and placing the nozzle guide vane assembly 14 in its proper operating position immediately forward of the turbine blading 15b.

Finally the combustion chambers 12 are installed in the usual manner between the diffuser casing 11 and the nozzle box 13 and the shroud ring and the tail cone 17 are mounted on the assembly of nozzle guide vanes 14.

Dismantling is performed by a simple reversal of the foregoing steps.

A slight rearrangement of the construction, which permits the nozzle box to be installed from the rear instead of from the front over the flange 27, is shown in Fig. 5. In this arrangement the backbone member 18', having a rearward end face 18a' is spigotted into a shallow annular depression in the mating face 23a' of the bearing support 23' and is held in contact therewith by cap screws 31' passing through an external annular flange 24' on the bearing support and entering sockets 32' in the backbone member. The bearing support 23' also carries a flange 26', as a radial extension of the flange 24', the flange 26' carrying forwardly extending studs 28' to pick up with the holes 29 in the nozzle box 13. It is apparent that the flange 26' in the modified arrangement serves the same function as the flange 26 in the construction previously described, though in the construction shown in Fig. 5 the flange is integral with the bearing support rather than with the backbone member. If the construction shown in Fig. 5 is adopted, the external diameter of the flange 27 supporting the diffuser casing 11 at the forward end of the backbone member 18 need not be smaller than the internal diameter of the flange 25 on the nozzle box, since the latter can be threaded over the backbone member 18 from the rearward end; the subsequent steps in the assembly operation correspond to those applicable to the construction previously described.

With a gas turbine engine constructed in accordance with this invention it is unnecessary to make provision for the turbine disc to be attached to its shaft after the shaft has been assembled in the engine or to make provision for the attachment of the rear bearing support to the main structure or the connection of oil and air services to the rear bearing by such devices as hand holes in the backbone member. Moreover, in the maintenance of the engine, ready access to the nozzle guide vanes and turbine blading is available without disturbing the assembly of the turbine or the main shaft; all that is required is the removal of the shroud ring and other elements of the aft structure and the dismantling of the combustion chambers, after which the nozzle box can be moved forwardly on the backbone member to allow the guide vanes and blading to be inspected and replaced.

It is to be understood that the form of the invention herewith shown and described is to be taken as a preferred example of the same and that various changes in the shape, size and arrangement of the parts may be resorted to without departing from the spirit of the invention or the scope of the subjoined claims.

What I claim as my invention is:

1. A gas turbine engine having a compressor in which air is compressed, a combustion system assembly in which fuel is burned in the compressed air, a turbine adapted to be driven by the products of combustion discharged from the combustion system assembly, a shaft connecting the turbine and compressor and supported in bearings, a hollow generally cylindrical backbone member surrounding the shaft and supporting the bearings, the combustion system assembly being annularly arranged around the backbone member, a nozzle box situated between the combustion system assembly and the turbine whereby the products of combustion are directed upon the turbine, the nozzle box being of generally annular form and being disposed around the backbone member adjacent the turbine, means removably attaching the combustion system in front of the nozzle box, and means for attaching the nozzle box on the backbone member including releasable fastening means locating the nozzle box relative to the backbone member in an axial sense away from the turbine, the said releasable means being accessible from the side of the nozzle box facing the combustion system assembly.

2. A gas turbine engine having a compressor in which air is compressed, a combustion system assembly in which fuel is burned in the compressed air, a turbine adapted to be driven by the products of combustion discharged from the combustion system assembly, a shaft connecting the turbine and compressor and supported in bearings, a hollow generally cylindrical backbone member surrounding the shaft and supporting the bearings, the combustion system assembly being annularly arranged around the backbone member, an outwardly extending flange on the backbone member adjacent the turbine, a nozzle box situated between the combustion system assembly and the turbine whereby the products of combustion are directed upon the turbine, the nozzle box being of generally annular form and having an inwardly extending flange engaging the outwardly extending flange on the backbone member, and means fastening the flanges together including means axially locating the inwardly extending flange relatively to the outwardly extending flange in the sense toward the turbine and means similarly locating the inwardly extending flange in the sense away from the turbine, the last mentioned means being demountable from the side of the nozzle box facing the combustion system assembly.

3. A gas turbine engine having a compressor in which air is compressed, a combustion system assembly in which fuel is burned in the compressed air, a turbine adapted to be driven by the products of combustion discharged from the combustion system assembly, a shaft connecting the turbine and compressor and supported in bearings, a hollow generally cylindrical backbone member surrounding the shaft and supporting the bearings, the combustion system assembly being annularly arranged around the backbone member, an outwardly extending flange on the backbone member adjacent the turbine, a nozzle box situated between the combustion system assembly and the turbine whereby the products of combustion are directed upon the turbine, the nozzle box being of generally annular form and having an inwardly extending flange engaging the outwardly extending flange on the backbone member on the face of the latter flange remote from the turbine, and demountable means fastening the flanges together, the said means being accessible from the side of the nozzle box facing the combustion system assembly whereby the nozzle box may be removed from the flange on the backbone member without displacing the turbine.

4. A gas turbine engine having a compressor in which air is compressed, a combustion system assembly in which fuel is burned in the compressed air, a turbine adapted to be driven by the products of combustion discharged from the combustion system assembly, a shaft connecting the turbine and compressor and supported in bearings, a hollow generally cylindrical backbone member surrounding the shaft and supporting the bearings, the combustion system assembly being annularly arranged around the backbone member, an outwardly extending flange disposed around the backbone member adjacent the turbine, another outwardly extending annular flange on the backbone member adjacent the compressor, a nozzle box situated between the combustion system assembly and the turbine adjacent the latter whereby the products of combustion are directed upon the turbine, the nozzle box being of generally annular form and having an inwardly extending flange engaging the outwardly extending flange on the backbone member on the face of the latter flange remote from the turbine, the outer diameter of the flange on the backbone member adjacent the compressor being less than the inner diameter of the flange on the nozzle box, and demountable means fastening the flanges together, the said means being accessible from the side of the nozzle box facing the combustion system assembly whereby the nozzle box may be removed from the flange adjacent the turbine without displacing the turbine, and passed over the flange adjacent the compressor.

5. A gas turbine engine having a compressor in which air is compressed, a combustion system assembly in which fuel is burned in the compressed air, a turbine adapted to be driven by the products of combustion discharged from the combustion system assembly, a shaft connecting the turbine and compressor and supported in bearings, a hollow generally cylindrical backbone member surrounding the shaft and supporting the bearings, the combustion system assembly being annularly arranged around the backbone member, a bearing support housing one of the bearings adjacent the turbine, annularly disposed means securing the bearing support on the backbone member, a flange on the bearing support extending radially outwardly from the annularly mounting on the backbone member, a nozzle box situated between the combustion system assembly and the turbine whereby the products of combustion are directed upon the turbine, the nozzle box being of generally annular form and having an inwardly extending flange engaging the outwardly extending flange on the bearing support on the face of the latter flange remote from the turbine, and demountable means fastening the flanges together, the said means being accessible from the side of the nozzle box facing the combustion system assembly whereby the nozzle box may be removed from the flange on the bearing support without displacing the turbine.

6. A gas turbine engine having a compressor in which air is compressed, a combustion system in which fuel is burned in the compressed air, a turbine adapted to be driven by the products of combustion discharged from the combustion system, a shaft connecting the turbine to the compressor and supported in bearings, a hollow, generally cylindrical backbone member surrounding the shaft in spaced relationship thereto, and having an annular surface facing the turbine, the combustion system being annularly arranged around the backbone member, a bearing support housing one of the bearings adjacent the turbine and having an annular surface engaging the said annular surface of the backbone member, a conduit in the backbone member and another conduit in the bearing support, one of the said conduits terminating in a liner protruding from one of the annular surfaces and the other of the said conduits terminating in a socket in the other of the annular surfaces, the liner extending into the socket to connect the conduits to each other, means fastening the annular surfaces together, an outwardly extending flange on the backbone member adjacent the turbine, a nozzle box situated between the combustion system and the turbine whereby the products of combustion are directed upon the turbine, the said nozzle box being of generally annular form and having an inwardly extending flange engaging the said flange on the backbone member, and means fastening the flanges together including demountable means locating the inwardly extending flange relative to the outwardly extending flange in the sense away from the turbine whereby the nozzle box may be removed from the said flange on the backbone member without displacing the turbine.

7. A gas turbine engine as claimed in claim 6 including sealing means between the liner and the socket whereby the conduits are sealedly connected.

References Cited in the file of this patent

UNITED STATES PATENTS

| | | |
|---|---|---|
| 2,479,573 | Howard | Aug. 23, 1949 |
| 2,526,410 | Price | Oct. 17, 1950 |
| 2,548,886 | Howard | Apr. 17, 1951 |
| 2,591,399 | Buckland | Apr. 1, 1952 |
| 2,608,057 | Boyd et al. | Aug. 26, 1952 |
| 2,609,663 | Newcomb | Sept. 9, 1952 |